(No Model.) 4 Sheets—Sheet 2.
G. D. MITCHELL.
APPARATUS FOR TREATING SEWAGE.
No. 580,793. Patented Apr. 13, 1897.
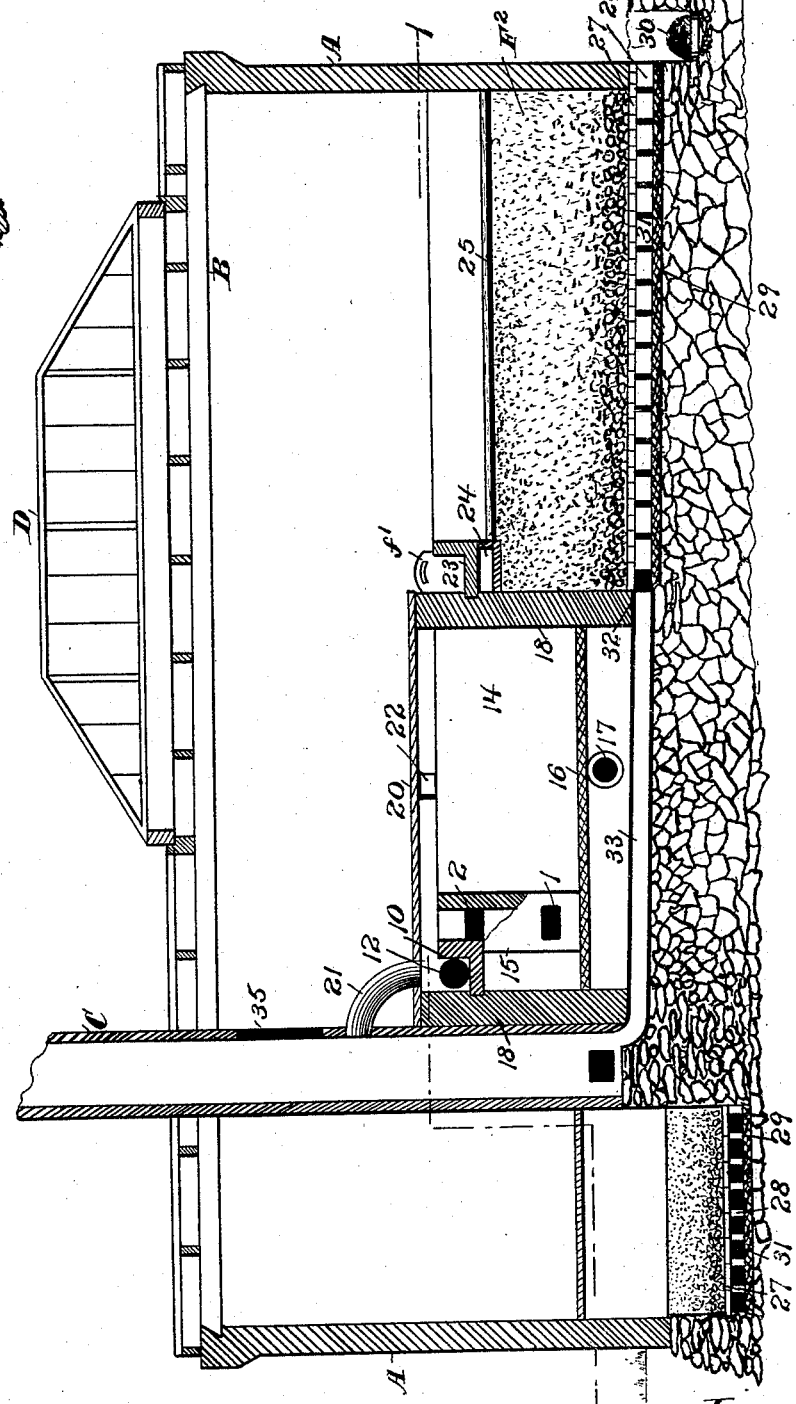

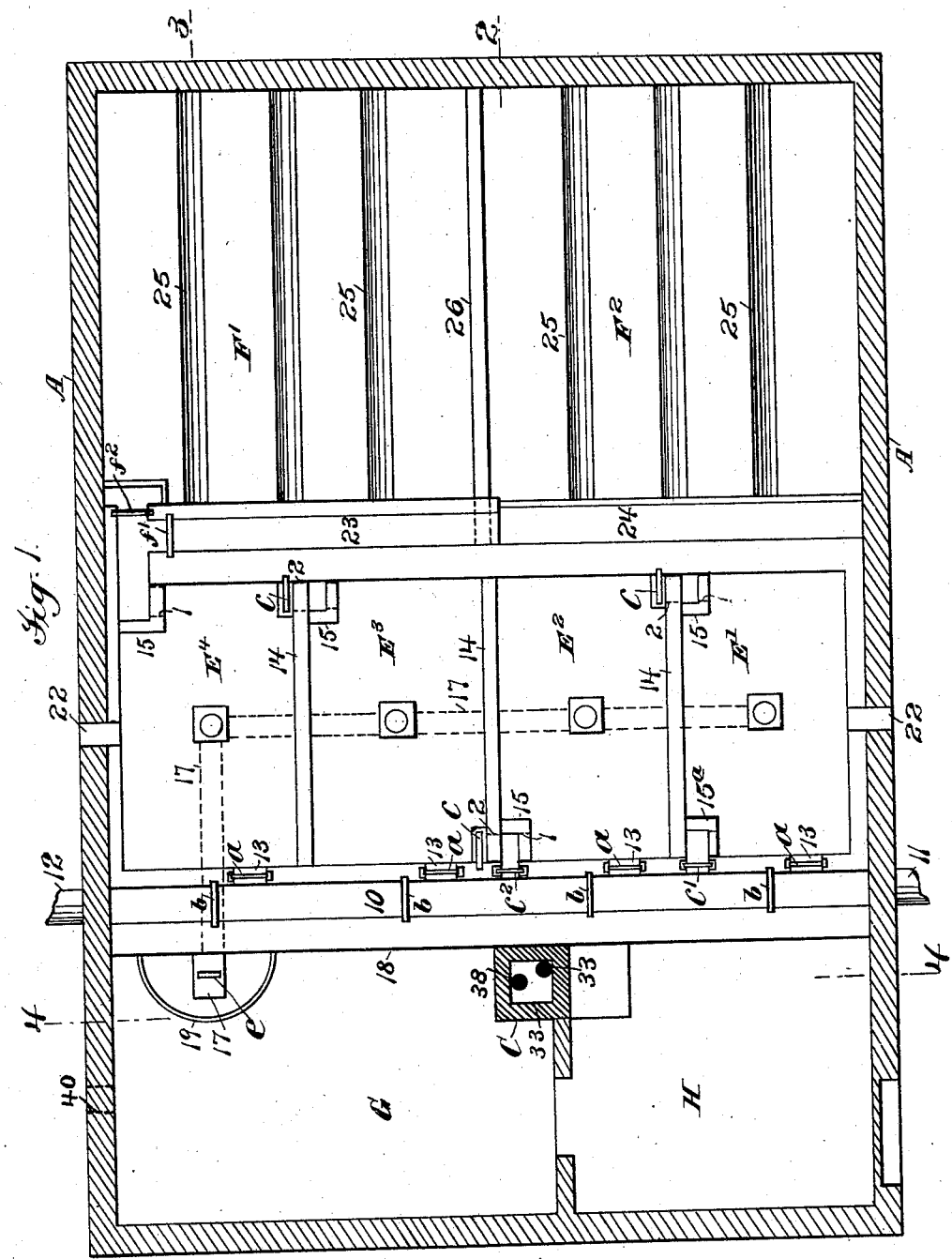

(No Model.) 4 Sheets—Sheet 3.
G. D. MITCHELL.
APPARATUS FOR TREATING SEWAGE.
No. 580,793. Patented Apr. 13, 1897.
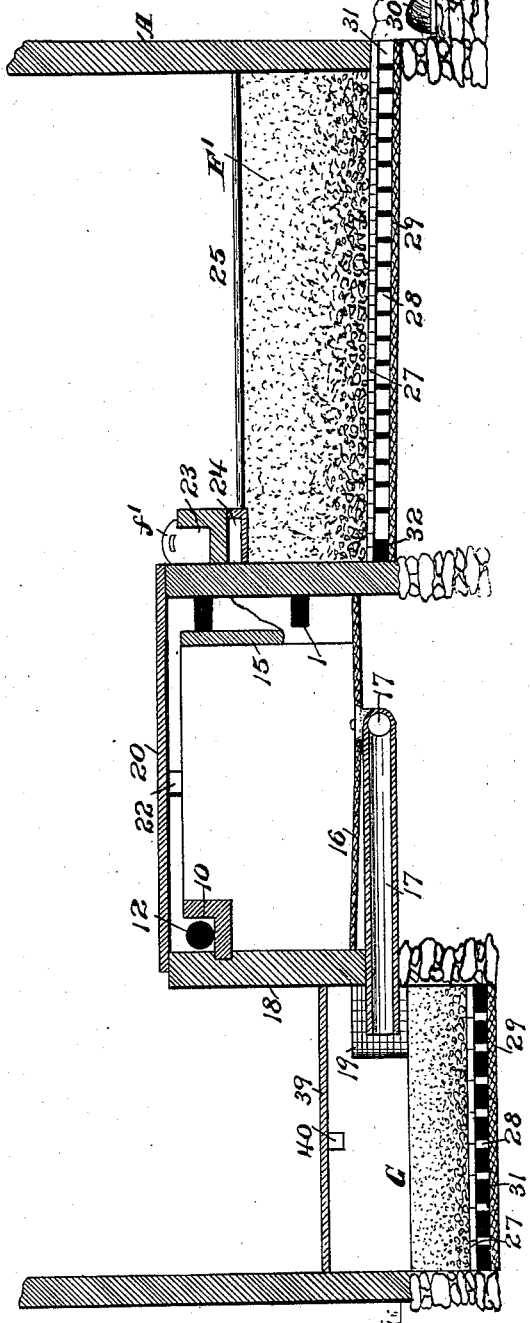

(No Model.) 4 Sheets—Sheet 4.

G. D. MITCHELL.
APPARATUS FOR TREATING SEWAGE.

No. 580,793. Patented Apr. 13, 1897.

Attest:
Nellie Maguire
A. T. Bourk

Inventor
Garryt D. Mitchell
By Philip Munson
& Phelps
Attys

UNITED STATES PATENT OFFICE.

GARRYT D. MITCHELL, OF CHELSEA, MASSACHUSETTS, ASSIGNOR OF ONE-HALF TO LUTHER C. CROWELL, OF BROOKLYN, NEW YORK.

APPARATUS FOR TREATING SEWAGE.

SPECIFICATION forming part of Letters Patent No. 580,793, dated April 13, 1897.

Application filed March 26, 1896. Serial No. 584,969. (No model.)

*To all whom it may concern:*

Be it known that I, GARRYT D. MITCHELL, a citizen of the United States, residing at Chelsea, county of Suffolk, and State of Massachusetts, have invented certain new and useful Improvements in Apparatus for Treating Sewage, fully described and represented in the following specification and the accompanying drawings, forming a part of the same.

The object of the present invention is to provide an improved apparatus for the treatment of sewage, the especial object of the invention being to provide an apparatus by which the solid constituents may be economically and inoffensively separated from the sewage-water and the latter purified sufficiently for final delivery into rivers or other bodies of water, although the latter form sources of water-supply.

The invention includes an apparatus for separating the solid matter from sewage which is of general application in sewage treatment, but is preferably used in connection with a subsequent treatment of the sewage-water and solid matter, so as to form a complete apparatus for treating sewage, which also forms part of my invention, and the invention includes, further, certain specific features of construction in such apparatus.

As a full understanding of the invention can best be given by a detailed description of an apparatus embodying the features of construction included in the invention, such a description will now be given in connection with the accompanying drawings, forming a part of this specification and illustrating a complete sewage-treating plant of the form preferred by me, and the features forming the invention will then be specifically pointed out in the claims.

Figure 5:
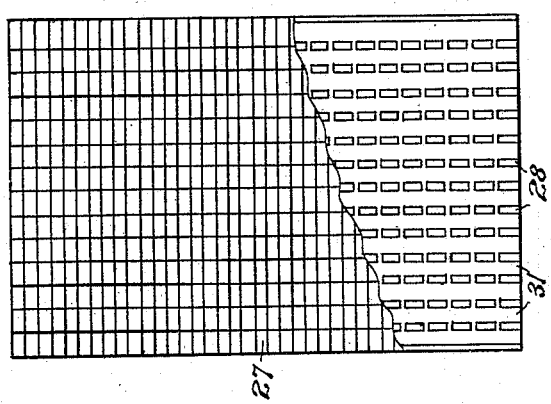
Figure 4:
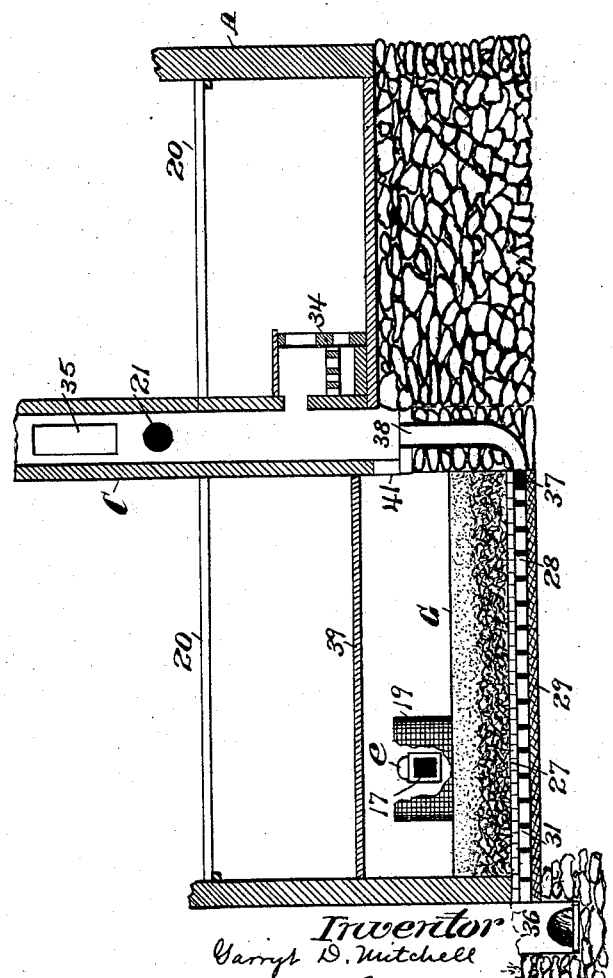

In the drawings, Figure 1 is a horizontal section of the inclosing building and plan of the plant therein, the section being taken on the line 1 of Fig. 2, that is, above the collecting-tanks, sludge-bed, and filter-beds, and with the covers of the collecting-tanks and sludge-bed removed. Fig. 2 is a vertical longitudinal section of the complete building and plant on the line 2 of Fig. 1. Fig. 3 is a similar section of the plant on the line 3 of Fig. 1. Fig. 4 is a cross-section on the line 4 of Fig. 1. Fig. 5 is a plan view of the support for the filter-bed with the support partially broken away to show the chamber below the filter-bed. Fig. 6 is a detail hereinafter referred to.

A are the walls and B the roof of the building, which completely incloses the plant, so that the gases pass off through the chimney C, which is of the height required for carrying away the gases and securing the desired ventilating-currents, which latter may be aided by a blower of any suitable form, if desired. The roof B is shown as provided with a skylight or glass roof D, which preferably extends over the whole or a large part of the filter-beds for a purpose presently to be described.

The building may be of any suitable form and will be varied in accordance with the size and arrangement desired for the inclosed plant, the land available, and other conditions. A simple and convenient construction is shown in which the building is rectangular and the plant formed of a row of four collecting-tanks occupying the central transverse portion of the building, with the sludge-bed and sludge-delivery room on one side and two filter-beds on the opposite side.

Referring now to the collecting-tank portion of the plant, the sewage is delivered to the tanks by a sluiceway 10, extending across the building and entered by the sewage-pipe 11 from outside the building at one end, and at the other end preferably connecting with a pipe 12, so that when desired all the sewage-water may be run directly through the sluiceway 10 and delivered from the pipe 12 without being treated. This is frequently desirable, as in case of a heavy storm or spring freshet, when the sewers carry large quantities of water and the proportion of sewage therein is so small that it is unnecessary or uneconomical to treat it. Each of the collecting-tanks $E'$ $E^2$ $E^3$ $E^4$ has a side passage 13 from the sluiceway, these passages being controlled by gates $a$, (shown as common vertically-sliding gates, but which may be of any suitable form,) and the sluiceway is provided opposite each tank with a gate $b$, of similar or other suitable form, so that by these gates $a$ $b$ the flow of sewage may be limited to a part of the sluiceway and delivered to any one of the collecting-tanks, or when all the gates $a$ are closed and all the gates $b$ opened the sewage may pass directly from the sewer-pipe 11, through the sluiceway 10, to the delivery-pipe 12, as above described.

The collecting-tanks operate to collect both the light and heavy solid matter from the sewage, the liquid portions passing through the tanks successively from tank $E'$ to tank $E^4$ or through a less number of tanks, if in any case this is desirable, as, for instance, when a tank is being washed, as described hereinafter, and the liquid is delivered from the last collecting-tank $E^4$ to the filter-bed. It is an important feature of my apparatus that the liquid passing through the successive tanks is taken from a point sufficiently beneath the surface of the sewage contained in the tanks to avoid carrying off that large portion of the solid constituents which rises to the surface. This point is preferably near the bottom of the tank, although this will depend somewhat upon the proportion of light and heavy solid matter in the sewage. By this process the liquid passing through the successive collecting-tanks is constantly purified by separation therefrom in each tank of both the light and heavy matter, the result being that with a series of three or four collecting-tanks the water passes from the last tank quite clear, and in some cases such a series of collecting-tanks may be used without final purification of the water by filtering or otherwise.

Many different constructions may be used for the purpose of drawing off the water from the proper point in one tank and delivering it to the next tank, and this may be done by any suitable arrangement of pipes or gates extending over the full width of the tanks or any portion thereof. In the construction shown each of the tanks $E'$ $E^2$ $E^3$ $E^4$ is provided in one corner adjacent to the partition 14, between the tanks, with a vertical pipe 15, conveniently formed by a casing and the partition, and having an opening 1 near the bottom of the tank, through which the water passes into the pipe, and an opening 2 near the top, through which the water passes into the top of the next tank, the openings 2 being controlled by gates $c$ of any suitable form, so that the passage of water between the tanks in either direction may be prevented when desired. These pipes 15, when placed in the corners of the collecting-tanks, are preferably arranged diagonally in the successive tanks, as shown, so as to compel the sewage to pass through the whole body of the tank and prevent a direct side current from one pipe to another, the object being to give the sewage as long a settling-time as convenient in each tank and prevent the formation of currents.

As the proportion of solid matter contained in the sewage varies to some extent at different times, as well as the relative quantities of light and heavy matter, it is sometimes desirable to vary the vertical position of the opening 1, so as to change the point at which the sewage-water is drawn off from the collecting-tanks and especially from tank $E'$. Any suitable construction may be used for this purpose. I have shown a construction in which the opening 1 in pipe 15 is formed between two vertically-sliding gates 3 4, so that the vertical position of the opening 1 may be varied by adjusting these gates, as will be clear from Fig. 6. These gates may be used also to close the opening 1, so as to prevent flow in either direction between the tanks, and gates $c$ be omitted, but preferably I use gates $c$ also, so that gates 3 4, when once adjusted to secure the proper result, need not be shifted unless required by the condition of the sewage.

The water from the last tank $E^4$ passes to the filter through a similar casing or pipe 15, provided with bottom opening 1, the water flowing into a sluiceway at a level near the top of the tank, so that the water is delivered from the last collecting-tank to the filter from a point near the bottom of the tank in the same manner as from one tank to another.

It is preferable that provision be made for cutting out the different tanks, so that one of them may be emptied and washed while the sewage treatment is continued by the other tanks. Tank $E'$ obviously may be cut out by closing its gates $a$ and $c$ and delivering the sewage from sluiceway 10 to the second tank $E'$, and both tanks $E'$ and $E^2$ may be cut out in the same way by delivering the sewage to tank $E^3$. It is desirable, however, that either tank $E^2$ or $E^3$ may be cut out and the other three tanks be available for use in treating the sewage, and this may conveniently be done by passing the sewage-water around either of these tanks through the sluiceway 10. In the construction shown this is provided for by a vertical pipe $15^a$ in tank $E'$, similar to the pipes 15 previously described and having a similar opening 1 near the bottom of the tank for the passage of the sewage-water, this pipe being placed adjacent to the sluiceway 10 and opening into the latter by a passage controlled by a gate $c'$, and by providing the vertical pipe 15 of the tank $E^2$ with a second opening similar to opening 2, but opening into the sluiceway controlled by a gate $c^2$. With this opening it is obvious that tank $E^2$ or tank $E^3$ may be cut out by passing the sewage-water from either tank $E'$ or tank $E^2$ into the sluiceway through the passage controlled by gate $c'$ or gate $c^2$ and returning it to tank $E^2$ or tank $E^3$, as the case may be, by opening the gate $a$ of the tank to which it is to be run, and gates $b$ of the sluiceway 10 being arranged as required for this course of the sewage-water.

Below the collecting-tanks and beneath the cement floors 16 of the same runs a pipe 17, the floors being inclined so as to drain into the pipe through a passage in the floor controlled by a gate $d$, which may be of any suitable form such as to be conveniently operated from the top of the tank, and this pipe 17 extends from beneath the last collecting-tank $E^4$ sidewise and has its outlet above the sludge-bed, the end of this pipe projecting through one of the side walls 18 of the tanks and preferably being provided with a screen 19 of wire-netting, wickerwork, or other suitable material, so as to hold any large solid matters passing from the collecting-tanks and thus prevent the clogging of the sludge filter-bed. This screen is constructed so that it may readily be removed and cleaned out when desired. The outlet of the pipe 17 is controlled by a gate $e$, of any suitable form, so that the pipe may be opened to the sludge-bed or closed, as desired.

Instead of delivering the sludge to the sludge-bed from pipe 17 at one point in the bed, as shown, it may be found desirable, especially when the sludge is very thick, to distribute its delivery over the top of the bed, and this may conveniently be done by attaching to the end of pipe 17 a flexible pipe by which the workman may distribute the sludge over the top of the bed as desired.

The collecting-tanks are preferably provided with a close cover 20, extending over the whole series of tanks, as shown, so as to prevent the passage of gases therefrom to the interior of the building, and the tanks preferably communicate directly with the chimney E, a pipe 21 being shown for this purpose, constant ventilation being secured by vents 22, opening to the outer air at opposite ends of the series of collecting-tanks, so that a ventilating-current of air constantly passes from the outside of the building over the tanks, beneath the cover 20, and through the pipe 21 to the chimney C, thus fully ventilating the collecting-tanks.

In the construction shown two filters $F'$ $F^2$ for the water from collecting-tank $E^4$ are shown, a plurality of filter-beds being preferably used, so that the beds may be used alternately, one bed resting for a day or two while the other bed is in use, as is preferable for the best results. For the purpose of supplying these filter-beds intermittently from the tank $E^4$ two sluiceways 23 24 are used, sluiceway 23 lying above the plane of sluiceway 24, the bottom sluiceway 24 delivering the water to filters $F'$ $F^2$ through shallow distributing-troughs 25 above the beds, from which the water overflows onto the latter, as common in such constructions, this sluiceway 24 being divided at the partition 26 between the two filter-beds, so that the opposite ends deliver to the respective beds, that part of the sluiceway 24 delivering to filter $F'$ being supplied directly from tank $E^4$, while that part of sluiceway 24 delivering to filter $F^2$ is supplied through upper sluiceway 23, sluiceways 23 and 24 being controlled by gates $f'$ $f^2$, so that by closing gate $f'$ and opening gate $f^2$ the water is delivered from tank $E^4$ to filter $F'$ through one end of sluiceway 24, and by closing gate $f^2$ and opening gate $f'$ the water is delivered through sluiceway 23 to the other part of sluiceway 24, from which filter $F^2$ is supplied.

The filter-beds may be formed of any suitable material such as is commonly used in filter-beds for this purpose, the material preferably being fine sand at the top and coarser material at the bottom of the bed, and the bed is suspended so as to provide an air-chamber below the bed, which preferably extends over substantially the whole area of the bed, so as to secure the free admission of air to all parts of the bottom of the bed as well as to the top of the bed. Any suitable construction may be used for the purpose of suspending the filter-bed and providing the required air-chamber below the bed, but a simple and efficient construction for the delivery of the effluent and securing these results is shown, in which the bed rests upon a flooring of soft or porous bricks or tile 27, which are laid flatwise and quite close together, so as to form a support which will prevent the passage of the filter-bed material, while the water will pass from the bottom of the bed through the material of the bricks or tile and between them, this floor 27 resting upon bricks or tile 28, placed edgewise to sustain the floor and bed, and at the same time expose as much of the under surface of the bed to the air as possible, these bricks or tile 28 resting upon the concrete bottom 29, which is inclined so that the water passing through the filter-bed is delivered through the spaces 31, between the bricks or tile 28, to the drain 30, extending along the bed outside the building, the top of this drain being open, as shown, so as to permit the free passage of air to the air-chamber below the bed above the water therein. The bricks or tile 28 are preferably separated, as shown, so as to permit the air to circulate through all parts of the air-chamber, and at the inner end next the wall 18 of the collecting-tanks is a larger vent 32, which runs the full length of the filter-beds, and with this vent 32 connects a pipe 33, running beneath the collecting-tanks and entering the chimney C at the bottom, as shown in Fig. 2. By this construction a constant air-current is maintained from the outer air through the air-chamber beneath the filter-bed and the pipe 33 to the chimney C, thus constantly supplying the bottom of the bed with air, aerating the effluent, and carrying off all gases therefrom through the chimney. The chimney will usually be sufficient to secure the current of air desired for this purpose, being made of suitable height, but it will be understood that a blower or air-pump of any suitable form may be used in the chimney or elsewhere, if desired, and more than one chimney for the building may be used, if required. In the construction shown, a furnace or heater 34, which may be of any suitable form, is used at the bottom of the chimney, both for the purpose of increasing the draft and to aid in destroying the sewage-gases.

The interior of the building above the filter-beds, tanks, and sludge-bed is connected with the chimney C through the ventilating-opening 35, all the gases arising within the building thus being carried off and the constant supply of fresh air required for the best operation of the filters F' F² secured.

I have found that by providing for the free admission of air over the bottom of the filter-bed the lower portion of the filter-bed is made efficient in the purification of sewage-water, so that the purifying action of the filter-bed is not limited to a narrow zone at the top of the filter-bed, as heretofore, and I am thus enabled to secure a much more efficient purifying action upon the sewage-water. I have also discovered that by admitting the light and heat of the sun to the filter-bed through a glass roof or glass walls, and thus approximating the outdoor conditions, I secure a far better purifying action upon the sewage-water than is otherwise possible with inclosed filter-beds, and this is the purpose of the skylight or glass roof D above the filter-beds previously referred to. The portion of the filter-bed inclosure formed by glass should be as large as convenient, as increase in the proportion of glass improves correspondingly the conditions, and not only a large portion of the roof, as in the construction shown, may be formed of glass, but also some portion of the walls, if convenient and the size of the plant warrants the expense.

The sludge-bed G, which receives the sludge from the pipe 17 through the screen 19, may be of any suitable construction, but preferably is formed of sand increasing in coarseness from the top downward, and this filter-bed is suspended and supported by two layers of bricks or tile 27 and 28, arranged flatwise and edgewise, resting upon the inclined concrete flooring 29, the upper flat layer preferably being of soft or porous bricks or tile, and the spaces 31 between the lower layer forming an air-chamber, as in the construction previously described in connection with the filters F' F², the water from the sludge-bed passing through this chamber to a gutter 36, whence the water may be disposed of in any suitable manner. If further purification of this water is desired, it may be run to another outside filter-bed or pumped up to filter-beds F' F² and finally delivered to gutter 30 with the filtered water from tank E⁴.

The chamber 31 below the sludge filter-bed G is also connected with the chimney C, so as to be ventilated in the same manner as that below the filters F' F², a ventilating-passage 37 extending along the inner end of the chamber and connecting with the bottom of the chimney by a pipe 38, as shown in Fig. 4. The sludge filter-bed is preferably provided with a tight cover 39 in the same manner as the collecting-tanks, so as to prevent the passage of gases from the sludge filter-bed to the interior of the building, and this space above the sludge filter-bed is ventilated by one or more vents 40, connected with the outer air through the walls of the building, and an opening 41 directly from the space above the bed to the bottom of the chimney.

At one end of the sludge-bed and above the latter is the work-room H, through which the sludge is removed from the top of the sludge-bed in suitable covered carts, to be disposed of in any suitable manner as usual in such cases, the door between this work-room and the sludge filter-bed being made tight and kept closed except when the sludge is to be removed, so as to keep the gases from the building.

It is usual in removing the sludge in sewage-treating plants to cart in sand or loam and mix it with the sludge, so as to prepare the latter for use in fertilizing or to enable it to be handled more readily. The upper part of the bed also is sometimes made of loam or sand of suitable character for mixing with the sludge for this purpose and this part of the bed renewed after the sludge is removed. The supply of loam or sand to the bed for such purposes may conveniently be secured by using a sand or loam receptacle above the bed arranged for the delivery of the sand or loam on the latter when desired. A cheap and convenient construction by which the sand or loam may readily be distributed over the bed is formed by providing the receptacle with a bottom funnel to which a flexible pipe may be attached for the delivery of the material as desired.

The operation of the plant will be understood from a brief description in connection with the drawings. The sewage enters the sluiceway 10 from the sewer-pipe 11, and the gate $a$ of tank E' being open and gate $b$ just beyond it in the sluiceway 10 being closed, the sewage passes through the gate $a$ into the first collecting-tank E', where the solid material is collected, the lighter material rising to the top and the heavier material settling to the bottom, while the sewage-water flows off gradually from tank E' to tank E² through pipe 15 and passages 1 2, entering the pipe 15 at the required point between the two bodies of collected material near the bottom and flowing over to the top of tank E² when the tank E' is nearly full, and the same collection and flowing off of the liquid from a point between the two bodies of solid material is repeated in each successive tank, the liquid thus passing through the successive collecting-tanks to tank E⁴, it being understood that in this operation the gates $a$ of all the tanks except tank E', the gates $d$ of all the tanks, and the gates $c'$ $c²$ of tanks E' E² are closed. From tank E⁴ the water passes into the sluiceway 24 through passage 1 in the last pipe 15, and is thence distributed by the troughs 25, the filtered water passing out at the bottom of the bed to gutter 30, as above described.

When it becomes necessary to remove the collected material from the collecting-tanks to the sludge-bed G and wash the tanks, the frequency with which this is required depending on the character of the sewage, the collected material at top and bottom of the tank is stirred up with the water in the tank to facilitate its movement, and the operation is as follows: Assuming that tank E' is to be emptied and washed, the gate $a$ of tank E' will be closed and the gate $a$ of tank E² opened, the gates $b$ in the sluiceway 10 being adjusted so as to deliver the sewage to tank E², three of the collecting-tanks being then used instead of four. The gate $c$ between tanks E' and E² is then closed to prevent backflow and the gate $d$ on the bottom of tank E' opened, so that the contents of tank E' may flow into and through pipe 17, and gate $e$ being open the contents of the tank E' will be delivered to the sludge-bed G. The tank E' having been thus emptied, the gate $e$ on pipe 17 is closed and the gate $d$ at the bottom of tank E⁴ opened, when the comparatively clear water from the tank E⁴ will back through the pipe 17 to the tank E'. When a sufficient quantity of water from tank E⁴ has thus been admitted to tank E' to clean the latter, the gate $d$ at the bottom of tank E⁴ is again closed, tank E' thoroughly washed with the water, and then this washing-water run off to the sludge-bed through pipe 17 by opening the gate $e$. The gates $a$ $b$ $c$ being now adjusted as before, the sewage may be again delivered to the tank E' and pass in succession through the other collecting-tanks.

When the tank E² is to be washed, the operation is the same as described in connection with tank E', but the sewage meanwhile passes into tank E' and the water therefrom through the pipe 15ª and gate $c'$ into the sluiceway 10 and around tank E², through gate $a$ of tank E³ into the latter tank, and thence to tank E⁴, the three tanks E' E³ E⁴ thus being used for the treatment of the sewage while tank E² is being washed, both the gates $c$ of tank E² being closed. When tank E³ is to be washed, tanks E', E², and E⁴ may be used by closing both the gates $c$ of tank E³ and passing the sewage-water to the sluiceway 10 from tank E² through pipe 15 and gate $c^2$, and thus to tank E⁴.

Tank E⁴ will require emptying and washing very seldom, as the water is quite clear when it reaches this tank, and this may readily be done while one of the other tanks is being filled after washing, so as to cause no stop in the receipt of sewage. Of course other arrangements for washing may be made, and, if desired, connections between tank E³ and the filters may be provided, so that the three collecting-tanks E' E² E³ may be run with the filters and tank E⁴ cut out when desired.

While it is preferable that the process of separating the solid material from the sewage should be continuous, as above described, the sewage being admitted continuously to one collecting-tank and the sewage-water allowed to flow off continuously through the successive tanks, the operation may be intermittent, a tank being filled with the sewage or sewage-water and the solid material collected therefrom at the top and bottom, and the flow to the tank being stopped while the sewage-water is withdrawn therefrom at a point near the bottom of the tank by pumping or flowing off the water to the extent desired or possible without drawing off the solid material, and the outlet then closed for filling the tank again, the collected material, with the water not drawn off, being removed and the tank washed after each filling or after a number of fillings, as required.

It will be understood that the features of construction claimed may be embodied in apparatus differing widely in form and arrangement from that illustrated.

What I claim is—

1. In a sewage-treating plant, a series of covered collecting-tanks having connections for flowing off liquid from each tank to the next tank from a point between the two bodies of light and heavy solid material collected at the top and bottom of the tank, in combination with one or more filters for the liquid delivered from the last tank, a covered sludge-filter, connections from the tanks to the sludge-filter, a building inclosing said tanks and filters, and connections for ventilating the collecting-tank and sludge-filter independently of the building, substantially as described.

2. In a sewage-treating plant, a series of covered collecting-tanks having connections for flowing off liquid from each tank to the next tank from a point between the two bodies of light and heavy solid material collected at the top and bottom of the tank, connections for carrying off the sludge from each tank, one or more filters for the liquid delivered from the last tank, a building inclosing said tanks and filter or filters, and separate ventilating connections for the collecting-tanks and the building, substantially as described.

3. A sewage-collecting tank having a delivery-pipe provided with an opening from the tank near the bottom of the latter and an outlet at the top of the tank, and means for adjusting vertically the position of the opening from the tank, substantially as described.

4. A series of sewage-collecting tanks having pipes 15 connecting said tanks and provided with opening 1 from and near the bottom of the tank from which the liquid is to be drawn and opening 2 near the top of the tank through which the liquid is delivered to the next tank, in combination with sewage-sluiceway 10, connected with the tanks, and gates controlling communication between the sluiceway and tanks and between the different tanks, substantially as described.

5. A series of sewage-collecting tanks having connections for flowing off liquid from a point below the level of liquid in each tank to the next tank, and gates controlling said connections, in combination with sluiceway 10, passages 13 between the sluiceway and tanks and gates controlling said passages, gates $b$ in said sluiceway, and other passages between the sluiceway and one or more of the first tanks of the series for flowing off the sewage-water to the sluiceway from a point below the level of the water in the tanks and controlled by gates, as $c'$ $c^2$, substantially as described.

6. A series of sewage-collecting tanks having connections for flowing off liquid from a point below the level of liquid in each tank to the next tank, and gates controlling said connections, in combination with sluiceway 10, passages 13 between the tanks and gates controlling said passages, and gates $b$ in said sluiceway, sludge delivery and washing pipe 17 below the tanks, and gates $d$ controlling the outlet from the tanks to pipe 17, substantially as described.

7. A series of sewage-collecting tanks having connections for flowing off liquid from a point below the level of liquid in each tank to the next tank, and gates controlling said connections, in combination with sluiceway 10, passages 13 between the tanks and gates controlling said passages, gates $b$ in said sluiceway, and other passages between the sluiceway and one or more of the first tanks of the series for flowing off the sewage-water to the sluiceway from a point below the level of the water in the tanks and controlled by gates, as $c'$, $c^2$, sludge delivery and washing pipe 17 below the tanks, and gates $d$ controlling the outlets from the tanks to pipe 17, substantially as described.

In testimony whereof I have hereunto set my hand in the presence of two subscribing witnesses.

GARRYT D. MITCHELL.

Witnesses:
  MELVILLE A. RICHARDS,
  CHARLES A. MAHONEY.